US 7,756,145 B2

(12) United States Patent
Kettering et al.

(10) Patent No.: US 7,756,145 B2
(45) Date of Patent: Jul. 13, 2010

(54) METHODS AND APPARATUS PROVIDING AN AIRBORNE E-ENABLED ARCHITECTURE AS A SYSTEM OF SYSTEMS

(75) Inventors: Christopher B. Kettering, Kirkland, WA (US); Daniel B. Moore, Bothell, WA (US); Freelon F. Hunter, Kent, WA (US); Jeffery L. Toolson, Marysville, WA (US); Charles D. Royalty, Bellevue, WA (US); Michael N. Jacobs, Clinton, WA (US)

(73) Assignee: The Boeing Company, Chicago, IL (US)

( * ) Notice: Subject to any disclaimer, the term of this patent is extended or adjusted under 35 U.S.C. 154(b) by 656 days.

(21) Appl. No.: 11/561,098

(22) Filed: Nov. 17, 2006

(65) Prior Publication Data

US 2007/0183435 A1 Aug. 9, 2007

Related U.S. Application Data

(60) Provisional application No. 60/741,819, filed on Dec. 2, 2005, provisional application No. 60/779,760, filed on Mar. 6, 2006.

(51) Int. Cl.
*H04L 12/28* (2006.01)
(52) U.S. Cl. .................. 370/401; 370/402; 370/404; 370/409; 709/227; 709/230; 709/246
(58) Field of Classification Search ........... 370/352–35, 370/401, 465, 467, 466, 468, 328, 331, 392, 370/399, 395.21, 463; 455/11.1, 226.1, 430, 455/431, 456.3, 513, 554.1; 709/224, 228, 709/229, 230, 332, 315, 316; 355/352, 353, 355/359
See application file for complete search history.

(56) References Cited

U.S. PATENT DOCUMENTS 5,778,203 A 7/1998 Birkedahl et al.

(Continued)

OTHER PUBLICATIONS

Thanthry et al. Aviation Data Networks: Security Issues and Netowkr Architecture , IEEE, 2004, pp. 77-81.*

(Continued)

*Primary Examiner*—Pankaj Kumar
*Assistant Examiner*—Anez Ebrahim
(74) *Attorney, Agent, or Firm*—Armstrong Teasdale LLP (57) ABSTRACT

A network architecture for implementation in a vehicle is described that comprises an Ethernet gateway module (EGM) and network interface module (NIM). The EGM comprises an Ethernet switch and router therein and is configured to provide an open data network (ODN) connection to the network architecture for a plurality of open data network devices. The NIM is configured to provide an isolated data network and comprises an Ethernet switch to connect a plurality of secure devices to an isolated data network (IDN), the secure devices related to operation and navigation of the vehicle, a router and a gateway/router. The router is configured to interface the IDN to the open data network connections and comprises a packet filtering function to determine which, if any, data from the ODN may be passed through to the IDN and applied to operation and navigation of the vehicle via the secures devices connected to the IDN. The gateway/router provides network address and protocol translation to connect the IDN to a secure common data network associated with vehicle operation. The architecture provides segregation between network devices in the IDN and CDN related to operation and navigation of the vehicle, and network devices in the ODN.

22 Claims, 2 Drawing Sheets

U.S. PATENT DOCUMENTS

| | | | |
|---|---|---|---|
| 6,133,846 A | 10/2000 | Birkedahl et al. | |
| 6,394,815 B1 | 5/2002 | Sarno et al. | |
| 6,801,769 B1 | 10/2004 | Royalty | |
| 6,910,149 B2 * | 6/2005 | Perloff et al. | 714/4 |
| 7,020,708 B2 * | 3/2006 | Nelson et al. | 709/230 |
| 2003/0003872 A1 | 1/2003 | Brinkley et al. | |
| 2004/0203558 A1 * | 10/2004 | Suzuki et al. | 455/403 |
| 2006/0200547 A1 * | 9/2006 | Edwards et al. | 709/224 |
| 2007/0021908 A1 * | 1/2007 | Jaugilas et al. | 701/208 |
| 2007/0106713 A1 * | 5/2007 | Allen et al. | 707/204 |

OTHER PUBLICATIONS

The World Airline Entertainment Association (WAEA), Introduction to IWG Documents, Aug. 2, 2001, 4 pgs, version 1.0, WAEA, Chicago, IL.

The World Airline Entertainment Association (WAEA), White Paper: On-Board Infrastructure, Aug. 2, 2001, 18 pgs, version 1.0, WAEA, Chicago, IL.

International Search Report from PCT/US2006/045593; Jan. 22, 2008; 14 pages.

Thanthry, N. et al.; "Aviation Data Networks: Security Issues and Network Architecture"; IEEE; 2004; pp. 77-81.

Schuster, P.; "Integrated Modular Avionics & APEX Standards"; AEEC Announcement Oct. 13, 2002; pp. 1-13.

Wargo, C. et al.; "Security Considerations for the e-Enabled Aircraft"; IEEE 2003; pp. 1-18.

* cited by examiner

METHODS AND APPARATUS PROVIDING AN AIRBORNE E-ENABLED ARCHITECTURE AS A SYSTEM OF SYSTEMS

CROSS REFERENCE TO RELATED APPLICATIONS

This application claims the benefit of U.S. Provisional Application No. 60/741,819, filed Dec. 2, 2005, and U.S. Provisional Application No. 60/779,760, filed Mar. 6, 2006, both of which are hereby incorporated by reference in their entirety.

BACKGROUND OF THE INVENTION

This invention relates generally to airplane design, and more specifically, to methods and apparatus that include an architectural implementation for providing an e-Enabled environment for airline operations, including airborne operations. In particular, an e-Enabled environment is defined which accommodates a "systems of systems" view of the features which ultimately bring value to airlines, including, one or more of pilots, flight attendants, mechanics, passengers, airline engineering, airline maintenance operations, and flight crew training.

Ethernet based networking and wireless technologies have become common in homes, offices, public places, and even airplanes. In recent years, aircraft installations have incorporated a number of Ethernet technologies to help with information management. Examples of such aircraft installations include one or more of wireless connections to passenger laptops to support internet access (via satellite), wireless connections from airplanes to airports to connect on-board networks to airline networks, wireless delivery of movie content to on-board in-flight entertainment systems via the airport network, wireless connections from specific components (e.g., flight data recorders) to portable airline devices for downloading data, on-board network file servers managing Ethernet networks and providing shared resources which host airline developed applications, and use of Ethernet-derived networks for connecting together traditional avionics computers Numerous industry forums are developing specifications and standards for aircraft installed Ethernet based networking and wireless components (e.g., ARINC 763, ARINC 664). These standards leverage off of the products being developed in non-aircraft commercial markets. The implementation and deployment challenge for incorporating Ethernet technologies on airplanes has not only been in configuring (e.g., ruggedizing) the commercially-derived components for the aircraft environment and in ensuring component and network compatibility, but has also been in defining a holistic end-to-end strategy for integrating the features that bring value to airlines.

Traditional avionics (e.g., flight management computers, air data systems, inertial data systems, flight directors/autopilots, flight deck displays, flight control computers, and maintenance computers) have been developed for decades as systems which typically include computing hardware, peripheral sensors and/or actuators, operating systems, and application software. Other airplane systems, such as the in-flight entertainment system, electronic elements of the mechanical/hydraulic systems, electronic engine controls, and other systems have similar characteristics.

Each of these airplane systems was installed onto the airplane due to the value that it provided to the airline operator. For example, flight management computer systems optimize aircraft flight profiles and reduced pilot workload. Flight control computers increase control precision and drove aircraft weight reductions. Maintenance systems track on-board failures, collect data for subsequent analysis, and reduce maintenance costs. In-flight entertainment systems keep passengers happy.

All these systems currently come with defined requirements and defined physical and data interfaces to other on-board airplane systems. Each airplane system is designed to be relatively isolated from other systems to ensure robustness, availability, and integrity. Typically, these systems are connected via industry standard or proprietary/custom networks (e.g., ARINC 429 data busses, ARINC 629 data busses, and ARINC 485 data busses). While the wiring is sometimes considered a system unto itself, this is more generally related to the physical wire and its susceptibility to damage or undesirable electromagnetic interference in the aircraft environment. The data content traversing the networks between the hardware and applications, sometimes referred to as data interface management, was generally scheduled and fully characterized prior to the system being installed on the airplane.

This airplane systems paradigm of data interface management does not apply to Ethernet based networks. The use of the open systems interconnection (OSI) reference model for conceptualizing information transference between computers has led to the decomposition and isolation of the physical, data link, network, and transport layers of the protocol stack from the session, presentation, and application layers. This has led to the development of the Ethernet based network itself as a system, providing common information delivery services to other systems, via switches, routers, and wireless connections. By extension, Ethernet servers have also become a part of the Ethernet-based network system (EbNS), as they provide common computing and data storage platforms to systems with software applications.

BRIEF DESCRIPTION OF THE INVENTION

In one aspect, a network architecture for implementation in a vehicle is provided that includes an Ethernet gateway module (EGM) and a network interface module (NIM). The EGM comprises an Ethernet switch and router therein and is configured to provide an open data network (ODN) connection to the network architecture for a plurality of open data network devices. The NIM is configured to provide an isolated data network and comprises an Ethernet switch, a router, and a gateway/router. The Ethernet switch is configured to connect a plurality of secure devices to an isolated data network (IDN), the secure devices related to operation and navigation of the vehicle. The router is configured to interface the IDN to the open data network connections and comprises a packet filtering function to determine which, if any, data from the ODN may be passed through to the IDN and applied to operation and navigation of the vehicle via the secures devices connected to the IDN. The gateway/router provides network address and protocol translation to connect the IDN to a secure common data network (CDN) associated with vehicle operation. The network architecture is configured to provide segregation between network devices in the IDN and CDN related to operation and navigation of the vehicle, and network devices in the ODN.

In another aspect, a method for networking components of a computer architecture is provided. The method includes configuring an Ethernet switch to connect external devices to an isolated data network (IDN), utilizing a packet filtering function within a first router to connect external devices to an open data network (ODN), providing network address and protocol translation with a gateway to connect the IDN to a secure common data network, and managing the ODN utilizing a second Ethernet switch and a second router.

In still another aspect, an airplane network architecture is provided that comprises a plurality of avionics devices, an Ethernet gateway module (EGM), and a network interface module (NIM). The NIM comprises an Ethernet switch to connect external devices to an isolated data network (IDN), a router comprising a packet filtering function to connect the IDN to an open data network (ODN) managed by the EGM, and a gateway/router providing network address and protocol translation to connect the IDN to a secure avionics common data network (CDN). The EGM includes an Ethernet switch and router for managing the ODN, and at least a portion of the external devices are connected to one or both of the IDN and the ODN to satisfy at least one of avionics network service requirements, avionics device isolation requirements, and avionics device availability requirements.

DETAILED DESCRIPTION OF THE INVENTION

The methods and apparatus herein described include an on-airplane Ethernet-based network system (EbNS), including the Ethernet physical and wireless network and infrastructure, which provide high bandwidth connectivity, flexibility, and enable the handling of large quantities of digital data content. As described herein, the traditional airplane systems, with their own computers, software, peripherals, and secure networks are connected to the EbNS. As such, the EbNS described herein is sometimes referred to as a system of systems that provide an e-Enabled environment for airline operations.

The effective deployment of an e-Enabled environment for airline operations and within a commercial-transport class of airplane utilizes a model for considering both traditional airplane systems and any new systems being provided to leverage the value that the e-Enabled environment provides. E-Enabling as utilized herein, refers to as the delivery of electronic information using one or more of a communication backbone, network technology, and the storage and utilization of that electronic information to provide valuable user services.

As further described below, existing airplane systems, the Ethernet-based Network System introduced above, and ground tools and supporting processes at an airline are actually building blocks of a broader, more encompassing, or holistic system, which spans the above described narrower systems. This results in a systems of systems concept which appears as business information flows through these building blocks provided by the narrower systems, bringing an additional level of value to airlines. More specifically, Ethernet-based Network Systems would not normally be installed on airplanes, as their components do not add value in and of themselves. However, and as described with respect to the figures described below, value is provided, for example, as the cost of keeping the navigational data current in the flight management computer system is reduced, as the data collected by the maintenance system is more closely coupled with the airline ground-side maintenance system, and as the overhead cost of having in-flight entertainment systems installed into seats that often get reconfigured is reduced, to name a few. However, for the e-Enabled environment to be successfully utilized in airline and aircraft operations, not only must the EbNS design be successful, but the more holistic integration of the data flow on and off an airplane must be successful. As such, any airborne e-Enabled architectural implementation necessarily addresses an intended usage of the systems of systems as further explained in the three example utilizations below.

In an e-Enabled environment, any system that ultimately refreshes navigational data in the flight management system also includes an airline process for receiving data updates from their data suppliers (e.g., Jeppesen), data handling and storage at the airline, wireless transmission of the data to the airplane (i.e., via an airport-owned wireless network), any alternative methods for non-wireless delivery or for handling component/network failures, movement of the data across the EbNS, security and integrity of the data while in storage or in transit, involvement of the mechanic in changing the configuration of the airplane using the data waiting on a storage device on the airplane, and an ability for the airline engineer that started this process to confirm successful completion.

Any system that more closely couples the data collected by the on board maintenance System with an airline ground-side maintenance system also includes policies for retaining (vs. overwriting) the data on the airplane, deployment of airport wireless access points at a key subset of airports visited, a decision to install satellite based broadband communications systems, a priority of transmitting maintenance data versus other data on/off the airplane, any alternate processes for physically removing the data or for handling component/network failures, re-formatting of the data for importing into the ground-side maintenance system, and assignment of responsibilities within the airline for selecting the data to be collected and ensuring that the data is flowing across the fleet.

Any system that deploys digital flight operations or maintenance manuals onto airplanes for use by pilots and mechanics also includes processes for receiving original digital content from the airplane manufacturer, tools and processes that allow the airline to modify this content to be consistent with their operations, selection of devices in the cockpit or mechanic devices for displaying data content, a method for providing configuration and version control to these data files, wireless transmission of the digital data to the airplane, a process for "installing" this content (by an authorized engineer at the airline, a mechanic, and/or a pilot), any unique security and integrity requirements for this type of content, any process for accomplishing partial (versus full) data uploads of these data files, and the process for working around on-board equipment failures that make the data unavailable.

Again, successful deployment of an e-Enabled environment in a commercial airline/airplane operations environment requires a system of systems model for understanding and addressing the on-airplane and off-airplane aspects of the implementation. A unique e-Enabled architectural implementation has been developed, which is described herein, to provide an environment which recognizes the nature of the above described system of systems concept, which is reflected in the components selected for the herein described embodiment of an Ethernet-based Network System. Specifically, the sub-networks that have been selected for the EbNS and its connectivity to the other on-board networks, the common services provided across the EbNS and accessible to systems hosted on other on-board networks, and the levels of redundancy provided within the EbNS to support the holistic systems that use the EbNS. In combination, this approach provides an environment that facilitates successful utilization by the systems that use the EbNS.

Figure 1:
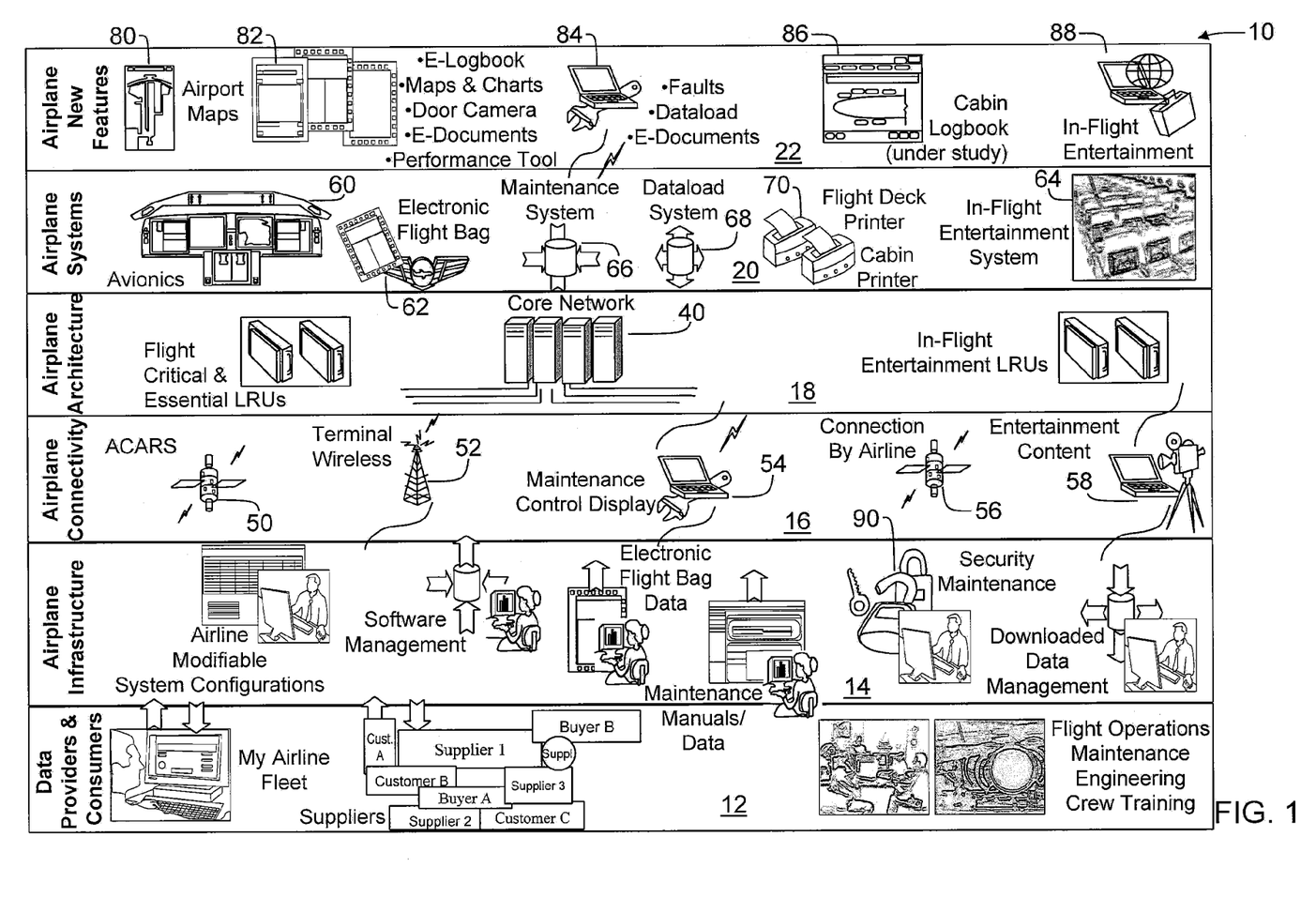
FIG. 1 is a diagram illustrating both an airplane and ground infrastructure associated with e-Enablement of airline operations.

FIG. 1 is a functional illustration of the above described system of systems concept and includes an exemplary infrastructure 10, more specifically, a functional illustration of an airplane and ground infrastructure utilized to provide an e-Enabled environment for airline/aircraft operations. Infrastructure 10 illustrates the relationship between, for example, ground-based infrastructure and supporting processes, the methods used to communicate data to the airplane, and as further described below, an on-board Ethernet-based network, and the airplane systems.

Functional infrastructure 10 includes data providers and consumers 12, airline infrastructure 14, airplane connectivity 16, airplane architecture 18, airplane systems 20, and airplane new features 22. Data providers 12 identifies the traditional providers of software and data to airlines for use on-board airplanes. These providers include the manufacturers of on-board computers, avionics, the aircraft manufacturer, and third parties under contract to the airline to provide services. One example of data provided by a data provider 12 is the software data being delivered to the airline, for example, by vendors and manufacturers, and then being managed and modified by the airline based on its infrastructure 14.

Airline infrastructure 14 identifies the role of the airline in managing the software provided by data providers 12 and the role of the airline in modifying certain data to customize system behavior (e.g., configuring pilot display formats) or in customizing charts and manuals to be consistent with airline practices or formats (e.g., use of Japanese language or custom landing procedures).

Airplane connectivity 16 refers to the methods for delivering the above described software and data content to an airplane. Traditional ACARS 50 (Airline Communications Addressing and Reporting System) is useful for transmitting a limited amount of data to the airplane, due to its limited bandwidth and relatively high cost. Therefore, ACARS 50 is not efficient for moving large amounts of data. An airplane terminal wireless system 52, which provides wireless connectivity to airports while the airplane is on the ground, provides high bandwidth transmission of data to and from the airplane. A satellite system 56 provides high bandwidth connectivity while the aircraft is en-route. In addition, airlines may have mechanics use maintenance control displays (MCDs) 54 (i.e., portable computers) to carry data to the airplane, where the MCDs 54 can be physically or wirelessly connected to the on-board Ethernet network.

Airplane architecture 18 addresses the airplane networking architecture and reflects the methods for delivering software and data to an airplane, uplinked software and data content being primarily received by a core network 40. The core network 40 includes both network servers for data storage and selective processing, and also provides Ethernet network management, with switches and routers. Much of the software and data is ultimately disseminated to various computers, including, for example, avionics systems and in-flight entertainment (IFE) systems, utilizing one of the illustrated airplane connectivity options, including, but not limited to, ACARS 50, wireless terminals 52, a maintenance control display 54, aircraft manufacturers data services 56, and entertainment content 58.

Airplane systems 20 include various systems that utilize the data, for example, avionics 60, an electronic flight bag 62, in-flight entertainment 64, maintenance systems 66, data load systems 68, and various airplane printers 70.

Airplane systems 20 places the focus on the systems which utilize the software and data, as opposed to the on-board computers themselves. These systems include, for example, the pilot controls and displays, flight management, printers, and IFE. The data load system 68 is utilized for loading the software and data into many of the computers within an airplane. A system, as used herein, represents a set of computing hardware, peripherals, software, and the networks that connect them.

Airplane new features 22 provides a summary and identification of new features associated with one embodiment of the present invention. Particularly, new features 22 includes an airplane which leverages the electronic data content, wireless connectivity, and Ethernet infrastructure herein described. New features 22 includes features that may be deployed to take advantage of the e-Enabling environment, for example, maps 80, charts 82, e-documents 84, wireless maintenance tools such as a cabin logbook 86, and wireless in-flight entertainment 88. Detailed airport maps 80 are displayed on the pilot displays, other electronic maps and charts 82, and electronic pilot and maintenance manuals (e-documents 84) are also provided. In addition, the electronic logbook/cabin-logbook 86 is used for reporting on-board failures and for capturing mechanic dispositions. In the embodiment, the content from the e-logbook is automatically and wirelessly transmitted to a ground-based receiver for use by the airline.

Further, the embodiment provides for wireless connectivity by mechanics and passengers to the above described on-board network for access to on-board data or for access to the internet or airline network via the airplane's wireless connectivity. The charts 82 then convey the concept of the delivery of data to the ground, such as that collected by the e-logbook and maintenance system. The data moves through the airplane architecture 18 and the airplane connectivity 16 and arrives at the airline infrastructure 14, where the airline receives and manages the data. Data providers and consumers 12 reflects the dissemination of the data to the various consumers of the data at the airline or to other third parties (e.g., engine manufacturers). Finally, there is a role reflected in airline infrastructure 14, security maintenance 90, which reinforces the responsibility of the airline to manage the security aspects of the process, which are inherent in any Ethernet based network.

The categories within infrastructure 10 convey both the architecture and utilization of an airplane e-Enabling system to deliver software and data to airplane systems and to provide valuable features to pilots, flight attendants, mechanics, and passengers. Infrastructure 10 also conveys the gathering of data on-board the airplane and delivery of that data to the ground for use by airline flight operations, line maintenance, maintenance planning, engineering, and crew training.

Figure 2:
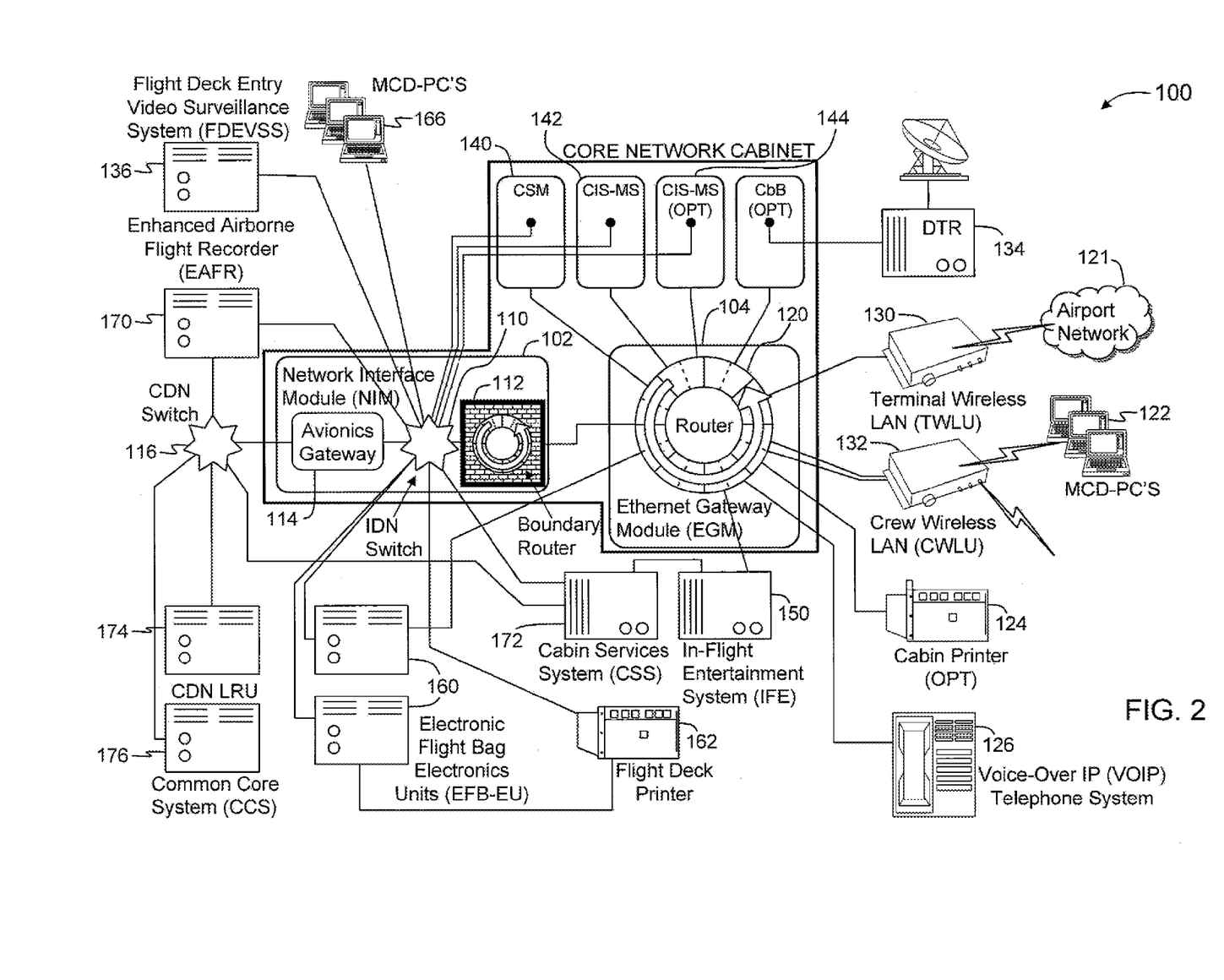
FIG. 2 is a block diagram illustrating functionality of a network interface module and an Ethernet gateway module utilized in providing an e-Enabled environment.

FIG. 2 is a component view for one embodiment of an airplane e-Enabling architecture 100 configured to provide segregation between secure network devices related to operation and navigation of a vehicle, and other non-secure network devices. FIG. 2 includes components selected for one embodiment of and EbNS, and their associated sub-networks and connectivity. As further described herein, two devices, a network interface module (NIM) 102 and an Ethernet gateway module (EGM) 104 provide segregated switch and router layers to manage the network and form a portion of core network 40 (shown in FIG. 1).

NIM 102 includes an Ethernet switch 110 to connect secure devices related to operation and navigation of the vehicle on a more isolated data network (IDN), a router 112 with a packet filtering function to connect the IDN to the more open data network (ODN) managed by EGM 104, and a gateway/router 114 providing network address and protocol translation to connect the IDN to the more secure avionics Common Data Network (CDN) through CDN switch 116. Peripherals may include one or more wired ports for mechanic tools, such as maintenance control displays, an Ethernet cockpit printer, and other systems. The architecture provides segregation between network devices in the IDN and CDN related to operation and navigation of the vehicle, and network devices in the ODN.

EGM 104 includes a combination Ethernet Switch and Router 120 for managing the ODN for a plurality of open data network devices, where virtual LANs managed by the switch and router 120 are preconfigured. Any data needing to cross these virtual LANs passes through the router 120 which provides packet filtering to determine which, if any, data from the ODN may be passed through to the IDN and applied to operation and navigation of the vehicle via the secures devices connected to the IDN. Peripheral wireless units provide connectivity to airports 121 and wireless MCDs 122 as described herein. Examples of these peripheral units include Ethernet cabin printers 124, voice over internet protocol (VOIP) telephones 126 and other systems. Wireless peripheral units are also contemplated.

The concept of using network switches and routers in general on airplanes is not new. However, what is accomplished through implementation of architecture 100 is that a layered design which isolates (via an ODN virtual LAN) the traffic moving through terminal wireless LAN units (TWLU) 130, crew wireless LAN units (CWLU) 132 and broadband satellite devices 134, from other ODN-hosted Systems, and from systems hosted on the Isolated Data Network (IDN), such as flight deck entry video surveillance system 136, as illustrated in FIG. 2. Only pre-specified, for example, per a loaded configuration file, wireless and broadband satellite traffic to an authorized IP address and port, and generally within a Virtual Private Network (VPN) tunnel, is allowed to pass to other components. Such a configuration provides security and control at the Ethernet-based Network System, while providing flexibility to the systems that rely on specific data moving to and/or from the ground based devices.

Still referring to FIG. 2 and architecture 100, servers are provided which host various applications. For example, where value is added, connections are provided to both networks (ODN and IDN) to deliver unique services. Specifically, a controller server module (CSM) 140 provides network management services (e.g., a domain name server) to the ODN, but it provides fault reporting across the IDN and hence to the common data network (CDN) through CDN switch 116 which hosts one or more maintenance systems within the common core system 176. An enhanced airborne flight recorder 170, cabin services system 172, and one or more common data network LRUs 174 (line replaceable units) are representative of multiple aircraft systems that may be connected to CDN switch 116. Such a configuration improves the fault isolation capability of the maintenance system, in the case of a failure of one or more of NIM Boundary Router 112 or EGM 104.

A crew information system/maintenance system (CIS-MS) file server module(s) (FSM) 142 provides data load services to systems on the CDN/IDN/ODN, file transfer and data retention services to systems on the CDN/IDN/ODN, wireless device control and communications, and MCD display support. These services are all provided via the IDN connection, to maximize isolation and the use of the router packet filters, except for the wireless device control and communications which are accomplished using a VPN directly on the ODN.

Passenger internet traffic, which originates in the in-flight entertainment (IFE) system 150 and utilizes the broadband satellite services is isolated to the ODN to maximize security. This use of direct connections of the Servers to one or both of the IDN/ODN, or the overt decision not to provide such, has aligned the services being provided with any systems that need to access these services.

The file transfer service and the associated wireless/satellite downlink service provided by the CIS-MS FSM 142 also helps manage data forwarding off of the airplane. Airplane systems can select the preferred wireless/satellite downlink path or can chose to default to the preferred path as determined by the CIS-MS FSM provided downlink service, based on airline preference, cost, etc. Alternatively, the EbNS does permit direct access to the wireless and satellite connections, for systems which prefer to establish their own downlink path criteria.

Systems that utilize the above described e-Enabled architecture 100 do so to gain an economic benefit for the airline. While some of the systems utilizing the e-Enabled connectivity may contribute to flight safety, loss of the on-board e-Enabling architectural components and supporting activities (e.g., handling and storage at the airline of data received from the airplane) can not be allowed to impact the ability to dispatch an airplane. Generally, components utilized in construction of the e-Enabled architecture will be single thread components, that is, they will have no redundancy. However, recognition of the intended utilization by certain systems has driven several specific architecture configuration decisions.

Referring again to FIG. 2, direct Ethernet wiring is provided between the electronic flight bag (EFB) 160 and flight deck printer 162, in addition to the connectivity provided through the IDN switch. This is to support the ability for airplane problem reports as gathered by the EFB hosted e-logbook system, and associated reported maintenance repair actions, to be offloaded from the airplane in the event of wireless/broadband satellite failure, and/or IDN and/or ODN failure. Lacking this, the e-logbook system would not have a satisfactory method for synchronizing the on-board digital data content with the airline airplane records database.

In one embodiment, a second CIS-MS FSM 144 is utilized as an airline-selectable optional server. Providing an optional server recognizes that some airlines may consider the data being collected on this server of high enough value to want to ensure its availability.

In one embodiment, a second MS-CIS FSM 170 is utilized as an airline-selectable optional server. Providing an optional server recognizes that some airlines may consider the data being collected on this server of high enough value to want to ensure its availability.

The following is a summary of various new design elements of the architectural implementation that provides an airborne e-Enabled environment. As described above, the e-Enabled environment accommodates a system of systems approach to airline/airplane operation and management.

More specifically, a selection of airborne Ethernet-based network systems components, sub-networks, connectivity, common services, and redundancy provides the support for end-to-end systems objectives, for example, one or more of refreshing navigational data to the flight management system, coupling on-board maintenance system data with airline ground-based maintenance systems, and the deployment of digital manuals onto aircraft for pilot or mechanic utilization. Such an approach results in efficiencies that provide maximum value to the airline.

The Ethernet-based network systems approach allows for layered configurations that utilize switches/routers to manage both an isolated data network and an open data network, thereby providing isolation to the data traffic moving through wireless and broadband satellite devices from other ODN-hosted systems and from systems hosted on the isolated data network. Traffic control is provided by pre-loaded configuration files.

The controller server module (CSM) 140 utilizes a dual connection. This dual connection provides network management services (e.g., a domain name server) to the ODN, but also provides fault reporting across the IDN, and hence to the CDN, which hosts the maintenance system.

Direct Ethernet wiring between an electronic flight bag (EFB) 160 and a flight deck printer 162, in addition to the connectivity provided through the IDN switch, supports an ability for airplane problem reports as gathered by an EFB hosted e-logbook system and associated reported maintenance repair actions. This interconnection allows problem reports to be offloaded from the airplane in the event of one or more of a wireless/broadband satellite 134 failure, an IDN failure, or an ODN failure. Multiple off-board connectivity options, including both terminal wireless (TWLU) and broadband satellite connectivity provide multiple options to airlines in how to move data to and/or from an airplane. Alternatively, a method of moving data using a physically connected portable MCD is also provided. Finally, configuring a second CIS-MS FSM 144 as an airline-selectable optional server recognizes that some airlines may consider the data being collected on such a server to be of high enough value to want to ensure its availability.

Direct Ethernet wiring between an electronic flight bag (EFB) 160 and a flight deck printer 162, in addition to the connectivity provided through the IDN switch, supports an ability for airplane problem reports as gathered by an EFB hosted e-logbook system and associated reported maintenance repair actions. This interconnection allows problem reports to be offloaded from the airplane in the event of one or more of a wireless/broadband satellite 134 failure, an IDN failure, or an ODN failure. Multiple off-board connectivity options, including both terminal wireless (TWLU) and broadband satellite connectivity provide multiple options to airlines in how to move data to and/or from an airplane. Alternatively, a method of moving data using a physically connected portable MCD is also provided. Finally, configuring a second MS-CIS FSM 170 as an airline-selectable optional server recognizes that some airlines may consider the data being collected on such a server to be of high enough value to want to ensure its availability.

The airplane network architecture described above, with its compliment of networks managed and segregated by switches and routers, along with the selection and alignment of services and external devices to one or more of the networks, and the selection of redundancy mechanisms has resulted in a product that is more efficient than other architecture configurations that have been considered.

For example, a unified network architecture might have been utilized, where all services and external devices were connected to a common switch. However, this configuration requires more extensive use of encryption and authentication of the messages between the system devices to protect integrity and confidentiality from unauthorized or malicious access. A unified network would also make all of the services and external devices more directly accessible to an unauthorized or malicious user and hence more vulnerable to direct attack.

Additionally, a network architecture could have been defined and utilized where the crew information system/maintenance system file server module (CIS/MS-FSM) provided wireless and satellite communications through a connection to the IDN, rather than through a connection to the ODN. However, connecting the wireless and satellite devices (terminal wireless, crew wireless, broadband satellite) to the ODN, would result in the routing of these communications through the router from the ODN to the IDN. The above described architecture allows the CIS/MS-FSM to manage encrypted communications across the ODN to the wireless devices, and then forward these communications without encryption via the IDN connection to the systems using the data on the IDN or on the avionics CDN. This configuration simplifies the design of the systems using the data, and generally eliminates the need for these systems to utilize security certificates, keys, encryption, digital signatures, etc.

Another alternative network architecture could be utilized where portable MCDs are always connected to either the IDN or to the ODN, independent of whether the connection was wired or wireless. The architecture described herein, however, provides a capability for a mechanic to directly access the on-board maintenance system using a physical (wired) connection, without the requirement for a functioning encryption mechanism, consistent with maintenance tools used on existing aircraft. The personnel access restrictions protecting the airplane flight deck and the electronics areas provide a level of assurance that the access is authorized. At the same time, the more flexible but potentially less secure wireless connection is provided via the ODN to gain the advantage of network security protection mechanisms. The airlines employing wireless MCDs bear additional responsibilities for ensuring that security certificates, keys, and encryption software are properly deployed and functioning correctly. However, a method for servicing the airplane without these mechanisms being in place is still necessary.

Finally, a network architecture where additional redundant components or wiring was provided as part of the network to improve reliability was considered. The architecture described herein, however, provides an appropriate level of redundancy to meet airline requirements, without unduly increasing system cost.

While the invention has been described in terms of various specific embodiments, those skilled in the art will recognize that the invention can be practiced with modification within the spirit and scope of the claims.

What is claimed is:

1. A network architecture for implementation in a vehicle, said network architecture comprising:
   an Ethernet gateway module (EGM) comprising an EGM Ethernet switch and an EGM router therein, said EGM to provide an open data network (ODN) connection to said network architecture for a plurality of open data network devices; and
   a network interface module (NIM) to provide an isolated data network, said NIM comprising:
   an NIM Ethernet switch to connect a plurality of secure devices to an isolated data network (IDN), the secure devices related to operation and navigation of the vehicle;
   an NIM router to interface the IDN to the open data network connections, said NIM router comprising a packet filtering function to determine which, if any, data from the ODN may be passed through to the IDN and applied to operation and navigation of the vehicle via the secures devices connected to the IDN;

an NIM gateway providing network address and protocol translation to connect the IDN to a secure common data network (CDN) associated with vehicle operation, said architecture providing segregation between network devices in the IDN and CDN related to operation and navigation of the vehicle, and network devices in the ODN;

an electronic flight bag (EFB) system connected to a flight deck printer by said NIM Ethernet switch; and a direct connection between said EFB system and said flight deck printer to address a failure of said NIM Ethernet switch, wherein said EGM, said NIM, the IDN, and the CDN are all located onboard the vehicle.

2. A network architecture according to claim 1 wherein said EGM isolates data received from at least one of a wireless device and a broadband satellite device from other devices hosted on the ODN and from systems hosted on the IDN.

3. A network architecture according to claim 1 further comprising a controller service module, said controller service module to provide network management services to the ODN and to provide fault reporting across the IDN.

4. A network architecture according to claim 3 wherein the IDN is to provide the fault reports to the CDN, wherein the CDN is to host an aircraft maintenance system.

5. A network architecture according to claim 1 further comprising a file server module, said file server module programmed to:

provide at least one of data load services, file transfer services, data retention services, and maintenance control display support via a connection to the IDN; and provide at least one of wireless device control and communications via a connection to the ODN.

6. A network architecture according to claim 5 wherein said file server module comprises a downlink service that includes a file transfer service for managing the transfer of data from an aircraft, the downlink service providing at least one of terminal wireless connectivity and satellite connectivity.

7. A network architecture according to claim 5 wherein said file server module enables selection, by one or more aircraft systems, of at least one of a preferred downlink path or a default to a preferred downlink path as determined by a downlink service within said file server module and a physically connected portable maintenance control display, the downlink service providing at least one of terminal wireless connectivity and satellite connectivity.

8. A network architecture according to claim 1 further comprising at least one file server module, each said file server module operating as an airline selectable optional server.

9. A network architecture according to claim 1 further comprising a connection to support airplane problem reports as gathered by an electronic logbook system within said EFB upon a failure of said NIM Ethernet switch.

10. A method for networking components of a computer architecture, said method comprising:

configuring a first Ethernet switch to connect external devices to an isolated data network (IDN);

configuring the first Ethernet switch to connect an electronic flight bag (EFB) system to a flight deck printer;

providing at least one direct connection between the EFB system and the flight deck printer to address a failure of the first Ethernet switch;

utilizing a packet filtering function within a first router to connect the IDN to an open data network (ODN);

providing network address and protocol translation with a gateway to connect the IDN to a secure common data network; and managing the ODN utilizing a second Ethernet switch and a second router.

11. A method according to claim 10 wherein managing the ODN utilizing a second Ethernet switch and a second router comprises isolating data received from at least one of a wireless device and a broadband satellite device from other devices hosted on the ODN and from systems hosted on the IDN.

12. A method according to claim 10 further comprising providing network management services to the ODN and fault reporting across the IDN utilizing a controller service module.

13. A method according to claim 12 further comprising configuring the IDN to provide fault reports to a common data network (CDN), hosting an aircraft maintenance system.

14. A method according to claim 10 further comprising:

providing at least one of data load services, file transfer services, data retention services, and maintenance control display support via a connection to the IDN using a file server module; and utilizing the file server module to provide at least one of wireless device control and communications via a connection to the ODN.

15. A method according to claim 14 further comprising managing the transfer of data from an aircraft using a downlink service within the file server module, the downlink service including a file transfer service and providing at least one of terminal wireless connectivity and satellite connectivity.

16. A method according to claim 14 further comprising configuring the file server module to enable selection, by one or more aircraft systems, of at least one of a preferred downlink path or a default to a preferred downlink path as determined by a downlink service within the file server module and a physically connected portable maintenance control display, the downlink service providing at least one of terminal wireless connectivity and satellite connectivity.

17. A method according to claim 10 further comprising configuring at least one file server module to operate as an airline selectable optional server.

18. An airplane network architecture comprising:

a plurality of avionics de-vices comprising at least one file server module, an electronic flight bag (EFB) and a flight deck printer;

an Ethernet gateway module (EGM); and network interface module (NIM) comprising:

a first Ethernet switch to connect external devices to an isolated data network (IDN);

a router comprising a packet filtering function to connect the IDN to an open data network (ODN) managed by said EGM;

a connection between said EFB and said flight deck printer provided through said first Ethernet switch; and an avionics gateway providing network address and protocol translation to connect the ION to a secure avionics common data network (CDN), said EGM comprising a second Ethernet switch and a router for managing the ODN, at least a portion of said avionics devices connected to one or both of the IDN and the ODN to satisfy at least one of avionics network service requirements, avionics device isolation requirements, and avionics device availability requirements, wherein said file server module is programmed to:

provide at least one of wireless device control and wireless communications via a connection to the ODN; and enable selection, by one or more aircraft systems, of at least one of a preferred downlink path and a default downlink path determined by a downlink service of said file server module, the downlink service providing at least one of terminal wireless connectivity and satellite connectivity, wherein said EGM, said NIM, the IDN, and the CDN are all located onboard the airplane, and a direct Ethernet wiring between said EFB and said flight deck printer is provided to address a failure of the connection within said NIM.

19. An airplane network architecture according to claim 18 wherein said network architecture provides an ability for problem reports to be offloaded from the airplane in the event of one or more of a wireless/broadband satellite failure, an IDN failure, and an ODN failure.

20. An airplane network architecture according to claim 18 wherein said plurality of avionics devices further comprises at least one physically connected maintenance control display.

21. An airplane network architecture according to claim 18 wherein said plurality of avionics devices comprises at least one file server module connected to both the IDN and the ODN to provide data load services to systems, file transfer and data retention services.

22. An airplane network architecture according to claim 18 wherein said plurality of avionics devices further comprises at least one file server module configured as an airline-selectable optional server.

* * * * *